United States Patent [19]
Good

[11] Patent Number: 5,971,363
[45] Date of Patent: Oct. 26, 1999

[54] TREE WINCH MOUNTING SYSTEM

[76] Inventor: Gregory P. Good, N55 W28311 Hwy. K., Hartland, Wis. 53029

[21] Appl. No.: 09/185,887

[22] Filed: Nov. 4, 1998

[51] Int. Cl.$^6$ ........................................................ B66D 1/00
[52] U.S. Cl. ............................ 254/323; 254/266; 254/389
[58] Field of Search .................................... 254/199, 264, 254/266, 323, 325, 389

[56] References Cited

U.S. PATENT DOCUMENTS

| | | | |
|---|---|---|---|
| 2,927,772 | 3/1960 | Kanouse | 254/323 |
| 4,819,912 | 4/1989 | Plummer | 254/266 |
| 5,484,253 | 1/1996 | Johnson | 414/787 |
| 5,593,139 | 1/1997 | Julian | 254/325 |
| 5,603,489 | 2/1997 | Regal | 254/378 |
| 5,607,143 | 3/1997 | Regal | 254/342 |

OTHER PUBLICATIONS

Lowerig Brakes, Sherrill Inc. Professional Aborist Catalog #6, p. 11 (admitted prior art).
Rigging Hardware, WesSpur, Inc. Climbing Catalog, p. 44 (admitted prior art).
False Crotch Blocks & Bollards, American Aborist Supplies, Inc., vol. VIII, p. 42 (admitted prior art).

*Primary Examiner*—Katherie A. Matecki
*Attorney, Agent, or Firm*—Andrus, Scealus, Starke & Sawall

[57] ABSTRACT

A tree winch mounting system includes a tree mount that straps to the stem of a tree and a removably attached winch. The winch is a self-tailing winch. The tree mount includes several incoming fair leads to appropriately guide approaching rope to the base of the winch drum, as well as an outgoing or return fair lead which guides rope as it returns to the winch for lowering. The outgoing fair lead is appropriately located to allow significant movement of the winch operator while attending to other tasks. The mounting system also includes a trailer hitch winch mount so that the winch can be used on a vehicle. In addition, other devices such as rope brakes, pad eyes, etc. can be removably attached to the tree mount and/or the trailer hitch mount.

24 Claims, 5 Drawing Sheets

TREE WINCH MOUNTING SYSTEM

FIELD OF THE INVENTION

The invention relates to tree maintenance and removal. In particular, the invention is winch mounting system that facilitates effective use of a tree-mounted winch (and possibly other tree-mounted devices) by workers located on the ground.

BACKGROUND OF THE INVENTION

Tree removal and limb maintenance often require sophisticated rigging and equipment (e.g., ropes, pulleys, climbing accessories, rope brakes, winches, etc . . . ) to control, lift and lower heavy limbs. In the past, tree-mounted winches have been used to provide tension on ropes for lifting, lowering and otherwise controlling tree limbs during removal. Many arborists appreciate the mechanical advantage provided by winches, however, the use of tree-mounted winches has proven to be cumbersome to date. In addition, winches are relatively expensive.

One of the primary problems with tree-mounted winches is that the combined weight of the tree-mount and winch tends to be excessive for convenient use by arborists. Prior art tree mounts include a mounting bracket and a strap winch attached thereto with rigging devices, such as a rope brake or winch attached to the tree mount. Some manufacturers have fabricated the tree mount from aluminum in order to lighten the weight of the system. However, in practice the heavy loads encountered in the field are often excessive for aluminum tree mounts. The use of tree-mounted winches has therefore been limited.

The present invention has been developed in an effort to provide an improved tree winch mounting system that is convenient and practical to use, yet sufficiently rugged to withstand normal use in the field.

SUMMARY OF THE INVENTION

The invention is a winch mounting system which includes a tree-mount that is secured to the stem of a tree, and is designed to allow a winch to be removably or detachably mounted thereto. Designing the winch to be removable from the tree mount provides several advantages not available in prior art devices. First, the tree mount can be more easily secured to the stem of the tree without carrying the winch and its weight. The construction of the tree mount can therefore be made more rugged without making the tree mount inconvenient to use. Another advantage is that the winch can be removed temporarily without unstrapping the tree mount from the stem of the tree. This provides convenient means for protecting the expensive winch from damage by falling limbs, etc. Another advantage of making the winch removable is that the winch can be used for other purposes, such as on a customized trailer hitch. Yet another advantage of making the winch removable is that the tree mount can be used to secure other rigging devices, such as a bollard or rope brake, a pad eye or pulley mount, etc.

In the preferred embodiment of the invention, the winch is a self-tailing winch that is removably mounted to a winch mounting plate. The winch mounting plate is preferably an aluminum plate. The tree mount includes a center backplate and a receiver that is integral or welded to the backplate. The receiver is adapted to removably receive the winch mounting plate. A right side wing plate and a left side wing plate are pivotally attached to the backplate. A strap winch and strap are attached to one of the wing plates. The other wing plate includes a slot for accepting a hook on the strap. With the backplate and wing plates against the stem of a tree, the strap is tightened around the stem of the tree to secure the tree mount to the tree. A locking mechanism secures the winch mounting plate in the receiver on the backplate. In this manner, the winch is secured in a fixed position relative to the stem of the tree when the strap is tightened. It is important that the components of the tree mount be sufficiently strong to withstand the heavy loads normally encountered in the field. The tree mount is preferably made from steel. Weight is not a problem because the winch is removable.

As mentioned, the winch is preferably a self-tailing winch that includes a self-tailing groove adjacent the winch drum to grip the rope. Preferably, the tree mount has appropriate incoming fair leads to align the rope with the intake on the winch at the base of the drum. In accordance with the invention, there are preferably three incoming fair leads: a right side fair lead, a left side fair lead and an upper fair lead. The fair leads are important so that the rope maintains alignment as it wraps around the winch, otherwise the rope can become knotted. The upper fair lead is preferably a captive fair lead with allows the incoming rope to approach the winch from a wide variety of upward directions and yet maintain proper alignment in the winch. Without a captive fair lead, it would probably be necessary, in most situations, to mount a pulley above the winch. By using a self-tailing winch, the winch can normally be operated by a single person to tighten the rope.

To lower a limb, the rope is removed from the self-tailing mechanism, and the winch operator grips the rope to carefully lower the limb. On occasion, it is desirable for the winch operator to move while lowering the rope without releasing the rope. However, to be safe and reliable, the rope must maintain alignment with the drum on the winch when it returns during lowering. In order to facilitate movement of the winch operator without releasing the outgoing rope, the tree mount preferably includes a hinge-mounted outgoing fair lead that is aligned with a return location on the drum of the winch. The outgoing fair lead is preferably a captive fair lead (e.g., a helical or rams horn captive fair lead) which maintains alignment with the outgoing rope even if the operator of the winch moves. This allows the operator to use their spare hand for other tasks, or to move to a safer area when necessary.

In its preferred embodiment, the winch mounting system also includes a trailer hitch winch mount that enables the winch to be removably mounted to a trailer hitch. The preferred trailer hitch winch mount includes a trailer hitch fitting having a horizontal platform and a vertical platform. A detachable winch mounting base plate can be mounted to either the horizontal platform or the vertical platform on the trailer hitch fitting. A winch mounting plate receiver is integral with or welded to the winch mount base plate. The receiver is adapted to receive the winch mounting plate in a manner similar to the tree mount, thus securing the winch on the trailer hitch.

Other devices such as a rope brake, or pad eye can be mounted on a mounting plate and used in connection with the tree mount or the trailer hitch mount in a manner similar to the winch.

Those skilled in the art should appreciate that the invention provides a particularly versatile system for utilizing a winch and other devices (e.g., a tree brake, a pad eye, etc.) when mounted to the stem of a tree or to a trailer hitch. Other advantages and features of the invention may be apparent to those skilled in the art upon inspecting the following drawings and description thereof.

DETAILED DESCRIPTION OF THE DRAWINGS

Figures 1, 2:
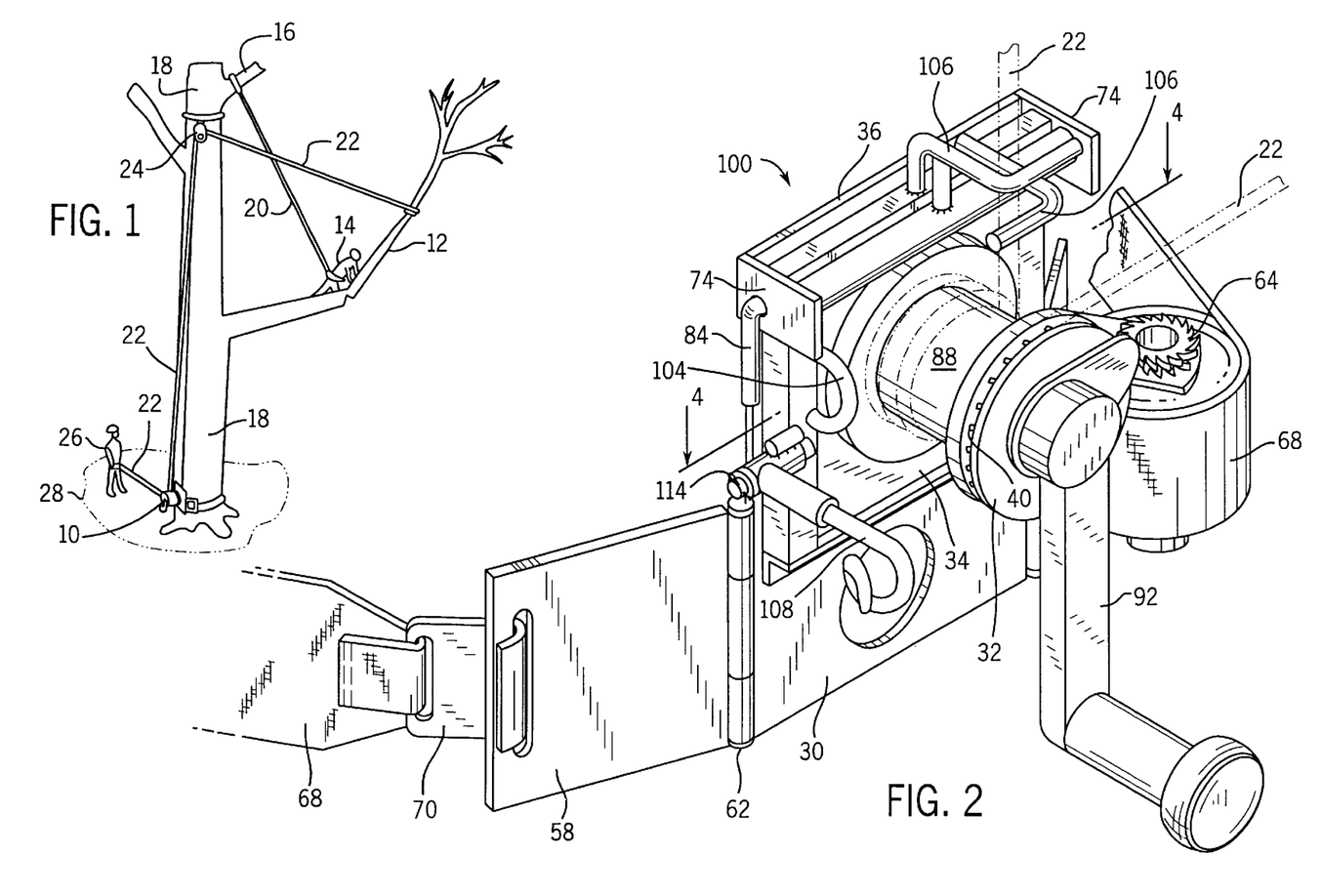
FIG. 1 is a schematic view illustrating typical rigging for limb removal using a tree-mounted winch in accordance with the invention.
FIG. 2 is a perspective view of a tree-mounted winch in accordance with the preferred embodiment of the invention.

FIG. 1 shows a typical use of a tree-mounted winch 10 for the removal of a tree limb 12. In FIG. 1, a climber 14 is harnessed and secured to an upper limb 16 of the tree 18 by rope 20. Typically, the climber 14 would be pruning, cutting or trimming limbs such as limb 12. A control rope 22 is secured to limb 12 to control the limb 12 while cutting, pruning or trimming. The rope 22 is also used to raise or lower the limb 12 in a controlled manner. The control rope 22 passes through a tree-mounted pulley 24, and then downward to the tree-mounted winch 10 at the stem of the tree 18. A worker 26 on the ground 28 operates the winch 10 and grips the control rope 22. It is important that the tree winch 10 be strapped tightly to the stem of the tree 18. While FIG. 1 shows a typical application for the use of a tree winch 10, tree winches can be used in other applications, for example applications using a lift truck rather than a climber 14, etc.

Figure 3:
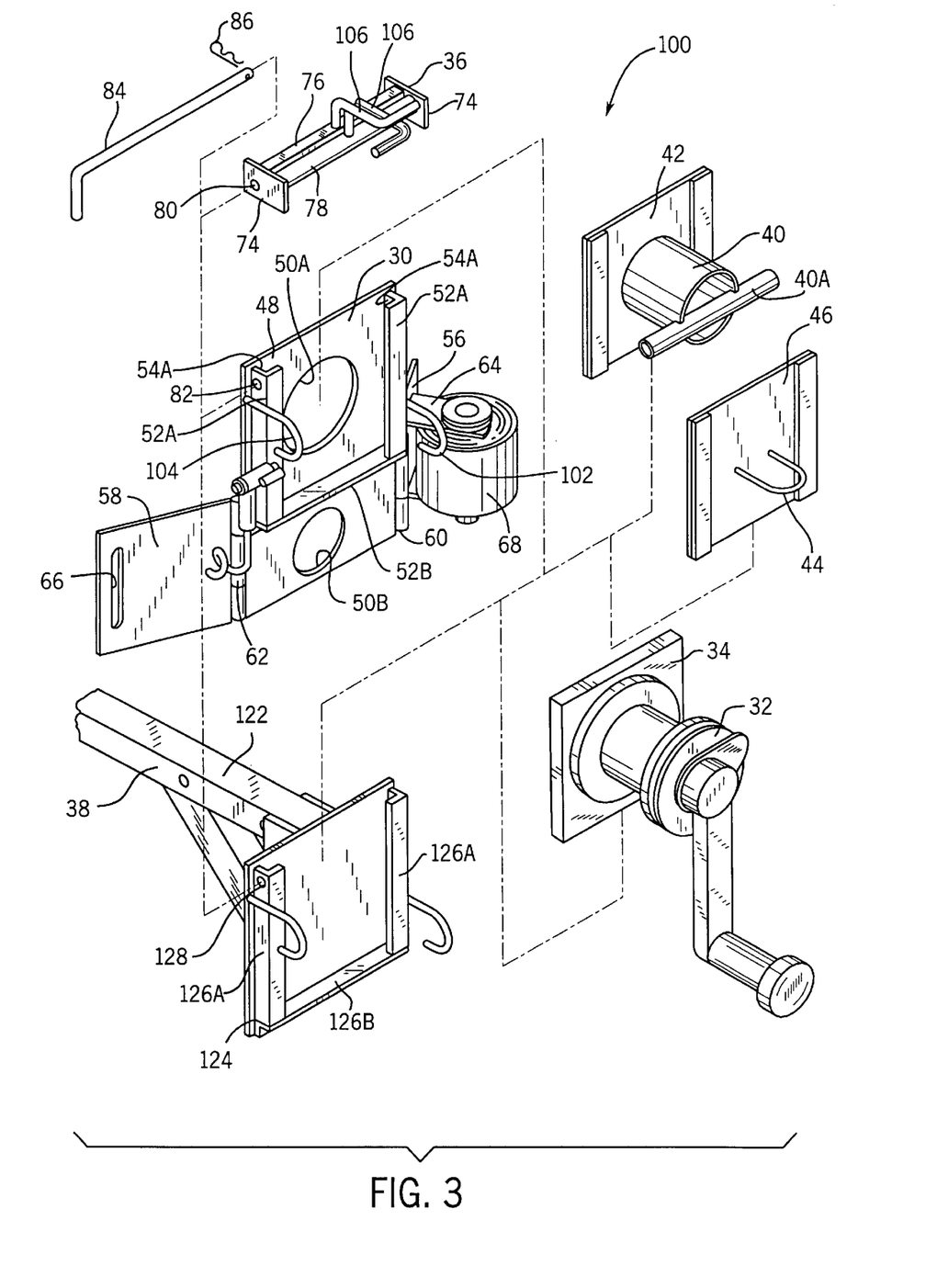
FIG. 3 is an exploded view showing the various components of a winch mounting system in accordance with the invention.

FIG. 3 shows the preferred components of a winch mounting system 100 in accordance with the invention. The preferred system 100 includes a tree mount 30, a winch 32 mounted on a winch mounting plate 34, a locking mechanism 36 for locking the winch mounting plate 34 in the tree mount 30, a trailer hitch winch mount 38, a bollard or rope brake 40 mounted on a mounting plate 42, and a pad eye 44 mounted on a mounting plate 46. The system 100 is designed so that the winch 32 and mounting plate 34, the rope brake 40 and mounting plate 42, and the pad eye 44 and mounting plate 46 can be interchangeably secured to either the tree mount 30 or the trailer hitch winch mount 38.

It is contemplated that the primary use of the system 100 will involve the use of the winch 32 and its mounting plate 34 secured to the tree mount 30. FIG. 2 illustrates the system 100 in this form. Referring in particular to FIGS. 2 and 3, the tree mount 30 includes a center backplate 48. The center backplate 48 is preferably fabricated from a ¼ inch hotrolled, mild steel plate and is approximately 8 ½ inches wide and 12 inches tall. The center backplate 48 contains holes 50a and 50b which are lightening holes to lessen the weight of the tree mount 30. The tree mount 30 also includes a winch mounting plate receiver 52a, 52b. The receiver 52a, 52b is integral with the center backplate 48 and is adapted to removably receive the winch mounting plate 34. More specifically, the receiver includes side guide walls 52a and a bottom stop wall 52b. The plate opening 54a in the sidewalls 52a of the receiver is sized to provide a small clearance (e.g., ¹⁄₁₀₀ of an inch) for the mounting plate 34, thus allowing convenient insertion and removal of the winch 32 and reducing the possibility of jamming. The receiver sidewalls 52a are preferably welded to the center backplate 48. The sidewalls 52a can be made from cut down angle iron, or can have slots 54a milled therein.

The tree mount 30 also preferably includes a right side wing plate 56 and a left side wing plate 58. Both wing plates are preferably hinge-mounted to the center backplate 48 via hinges 60, 62, respectively. A strap winch 64 is mounted to the right wing plate 56. The left wing plate 58 includes a slot 66 for a hook 70 on the strap 68.

Figures 4, 5, 6, 7:
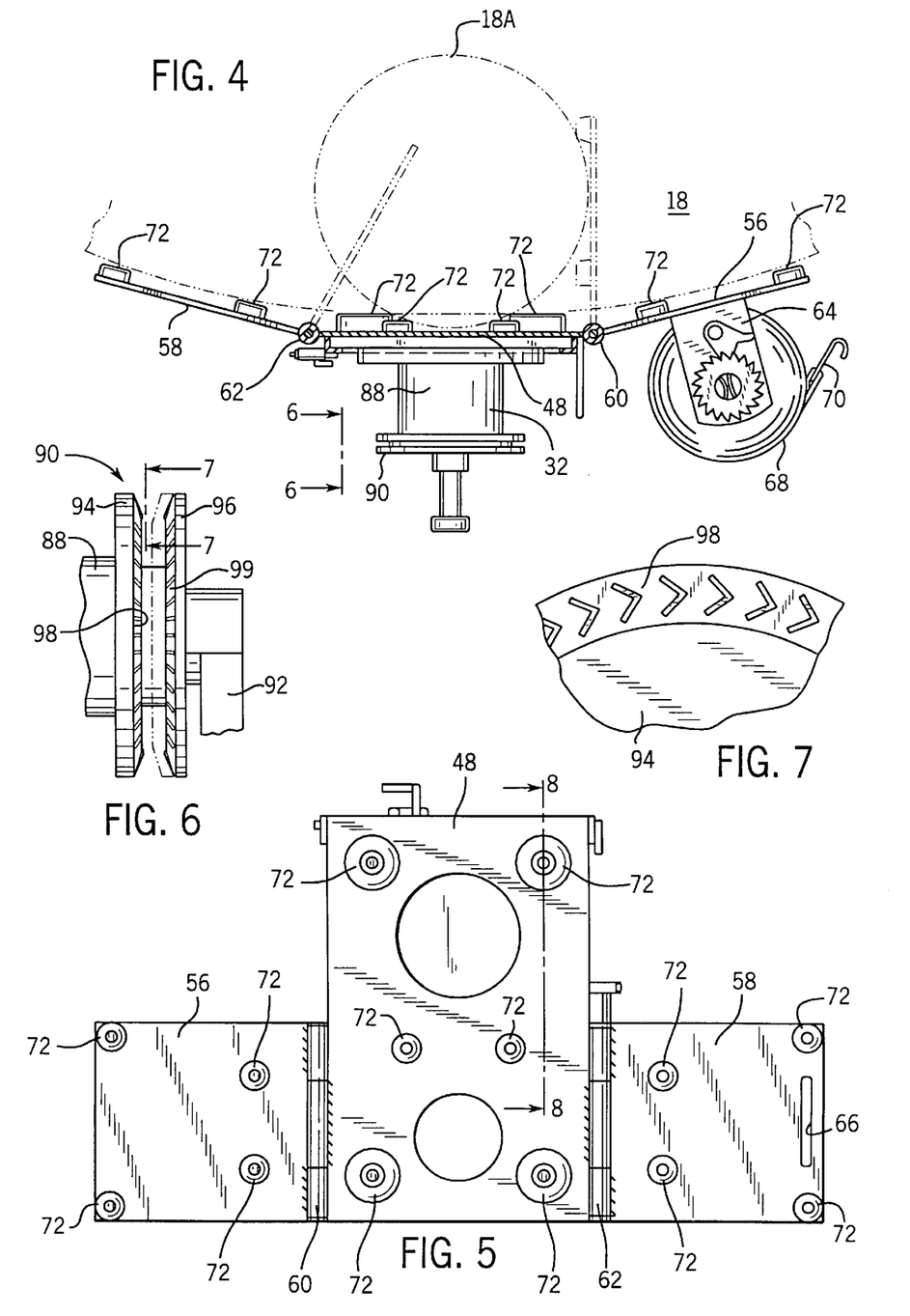
FIG. 4 is a sectional view of a tree-mounted winch in accordance with the invention as taken along line 4—4 in FIG. 2.
FIG. 5 is a rear elevational view of the tree-mounted winch shown in FIG. 2.
FIG. 6 is a detailed view of the self-tailing mechanism for the winch shown in FIGS. 2 and 4 as taken from the perspective of line 6—6 in FIG. 4
FIG. 7 is a detailed view of the self-tailing mechanism as taken from the perspective of line 7—7 in FIG. 6.

Referring now to FIGS. 4 and 5, the back side of the center backplate 48, and the back sides of the wing plates 56 and 58, preferably have rubber mounting feet 72 attached thereto. The purpose of the rubber mounting feet 72 is to provide cushioning and traction against the stem of the tree 18. The center backplate 48 preferably includes four large rubber mounting feet 72 and at least two smaller rubber mounting feet 72 which are located closer to one another. The smaller rubber mounting feet 72 on the center backplate 48 accommodate smaller diameter trees, see 18a in FIG. 4. The hinge-mounted wing plates 56 and 58 pivot as shown in FIG. 4 also to accommodate various tree diameters. It should be noted that the receiver 52a, 52b is attached to the upper portion of the center backplate 48 to maintain stability of the tree mount against the stem of the tree under heavy loads.

Referring again to FIGS. 2 and 3, the tree mount 30 also includes a locking mechanism 36, that secures the winch mounting plate 34 in the receiver 52a, 52b on the center backplate 48. The locking mechanism 36 preferably consists of two parallel end plates 74, with an angle iron stop 76 and a reinforcement dowel 78 spanning therebetween. The end walls 74 each preferably include a pin opening 80 underneath the angle iron stop 76. In use, the locking mechanism 36 is placed on the tree mount 30 so that the angle iron stop 76 abuts the top of the receiver sidewalls 52a, see FIG. 8. The receiver sidewalls 52a include corresponding pin openings 82 which align with the pin openings 80 on the locking mechanism 36. A locking pin 84 is then placed through the pin openings 80 in the locking mechanism 36 and the pin openings 82 in the receiver sidewalls 52 to secure the locking mechanism 36 on the tree mount 30. A cotter pin 86 is used to prevent inadvertent removal of the locking pin 84. As shown best in FIG. 8, the winch mounting plate 34 is secured in the receiver 52a, 52b by the locking mechanism 36 between the bottom stop wall 52b of the receiver and the locking pin 84.

Referring still to FIGS. 2 and 3, the winch 32 is preferably an internally geared, self-tailing winch. A suitable winch is available from Harken, Inc., Pewaukee, Wisconsin. The preferred winch has a 22:1 mechanical advantage when the handle 92 is cranked in the clockwise direction, and a 44:1 mechanical advantage when the handle 92 is cranked in the counter-clockwise direction. The winch 32 is preferably mounted to an aluminum mounting plate 34 due to weight considerations (e.g., an approximately 8×8.5 inch aluminum plate preferably having a width of ⅝ inch). As shown best in FIG. 2, the incoming rope 22 is wound around the drum 88 of the winch 32 near the base of the winch 32. The rope 22 propagates outward along the drum 88 as it wraps around the drum 88 towards the self-tailing mechanism 90. The self-tailing mechanism 90 on the winch 32 grips the outgoing rope 22, and allows the user to apply tremendous loads on the rope 22 by merely cranking the handle 92 on the winch 32. FIGS. 6 and 7 show the self-tailing mechanism 90 in detail. The self-tailing mechanism 90 preferably consists of a single groove disposed between walls 94 and 96, respectively. The inside surface of the walls 94, 96 are diverging from one another to form a wedge-shaped groove for a single strand of rope. The inside surfaces 98, 99 of the groove also include an elastomeric portion having a friction pattern thereon, see FIG. 7.

For proper operation of the winch 32 especially under heavy loads, it is important that the rope 22 be properly aligned when the rope 22 is approaching to the winch 32. To promote proper alignment of incoming rope 22, the tree mount 30 includes a right incoming fair lead 102 and a left incoming fair lead 104. The left incoming fair lead guides rope 22 when it comes from the left of the winch 32 along the top of the winch drum 88 at the base of the drum 88. The right incoming fair lead 102, on the other hand, guides rope 22 when it is incoming from the right side of the winch 32 along the bottom of the winch drum 88 at the base of the drum 88. The right and left incoming fair leads 102, 104 are preferably made of ½ inch diameter steel rod which is welded to the tree mount 30 at the appropriate locations. If the diameter of the fair leads 104, 102 is too small, the fair leads can cause premature rope wear or even cause tears.

An upper incoming fair lead 106 is welded to the locking mechanism 36. The upper incoming fair lead 106 is a captive fair lead, which means that the fair lead 106 controls the alignment of incoming rope 22 from a variety of upward directions. The use of the captive fair lead 106 on the locking mechanism 36 eliminates the need to mount a pulley or the like at a location above the winch 32 to maintain proper alignment of the rope 22 as the orientation of the approaching rope varies during a removal job. The upper incoming fair lead 106 aligns the incoming rope 22 at an intake location on the right side of the winch drum 88 along the base of the drum 88. The respective arms 106 for the upper incoming fair lead are preferably constructed from ½ inch diameter steel rod which is welded to the locking mechanism 36.

Figures 8, 9, 10:
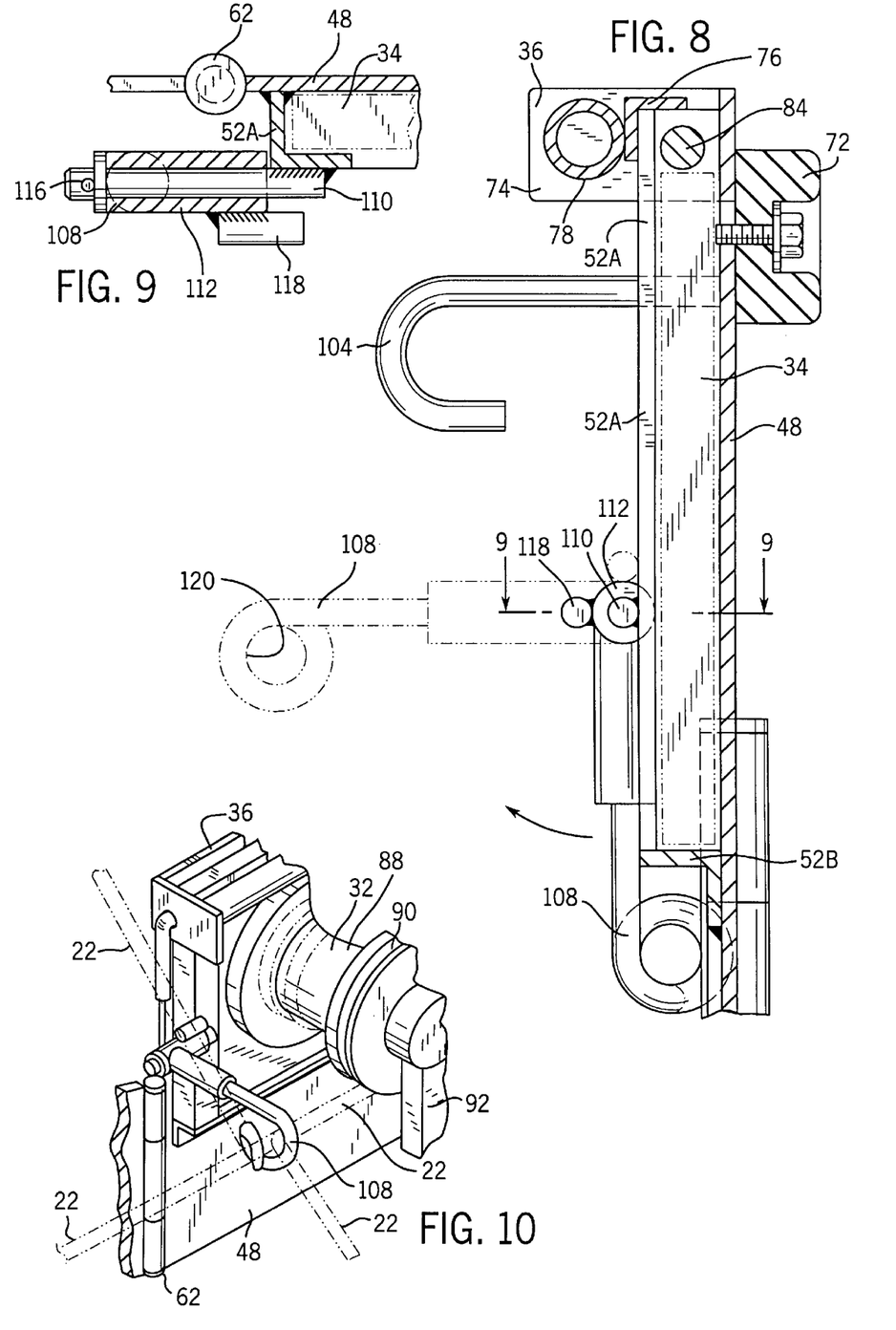
FIG. 8 is a sectional view of the tree mount as taken along line 8—8 in FIG. 5.
FIG. 9 is a sectional view showing a hinge-mounted, outgoing fair lead taken along line 9—9 in FIG. 8.
FIG. 10 is a detailed perspective view of the tree-mounted winch illustrating use of the captive outgoing fair lead in accordance with the invention.

The tree mount 30 also preferably includes an outgoing or return fair lead 108. The outgoing fair lead 108 is a fully captive rams horn or helical-type fair lead. The outgoing fair lead 108 is hinge-mounted to the tree mount 30, and in particular hinge-mounted to one of the receiver sidewalls 52a. Referring to FIGS. 8–10, a hinge pin 110 is welded to the receiver sidewall 52a. A hinge sleeve 112 is pivotally mounted over the hinge pin 110. The hinge sleeve 112 is secured to the hinge pin 110 by placing a cotter pin 114, FIG. 2 in hole 116 on the hinge pin 110. The fair lead 108 is secured to the hinge sleeve 112. As is best shown in FIG. 8, the outgoing fair lead 108 is repositionable between an in-service position (shown in phantom) and a non-use position (downward). A stop 118 is welded to the hinge sleeve 112. The stop 118 is located on the hinge sleeve 112 such that the fair lead guide 120 is aligned with the tailing mechanism groove 90 when the stop 118 abuts the receiver sidewall 52a.

FIG. 10 illustrates the importance of the outgoing fair lead 108. In order to safely lower the rope 22, it is important that the rope 22 be directed relatively straight and in alignment as it returns to the winch drum 88. FIG. 10 illustrates that the outgoing fair lead 108 ensures acceptable alignment of the returning rope 22 even when the winch operator, or other rope holder, needs to move and causes the rope to otherwise become severely misaligned.

As previously mentioned, the tree mount 30 is designed to receive other devices besides the winch 32. Referring again to FIG. 3, a rope brake 40 mounted on a mounting plate 42 can be inserted into the receiver 52a, 52b on the tree mount 30 and locked into place using the locking mechanism 36. The rope brake 40 preferably consists of a fixed non-movable drum 40 welded to the mounting plate 42 with a 6 inch pipe 40a mounted to the opposite side of the drum 40. Alternatively, a pad eye or pulley mount 44 attached to a mounting plate 46 can be inserted into the tree mount 30 in a similar manner. It is probably not desirable that the mounting plates 42, 46 be aluminum plates because weight should not be much of a concern for these devices.

Figures 11, 12, 13, 14A, 14B:
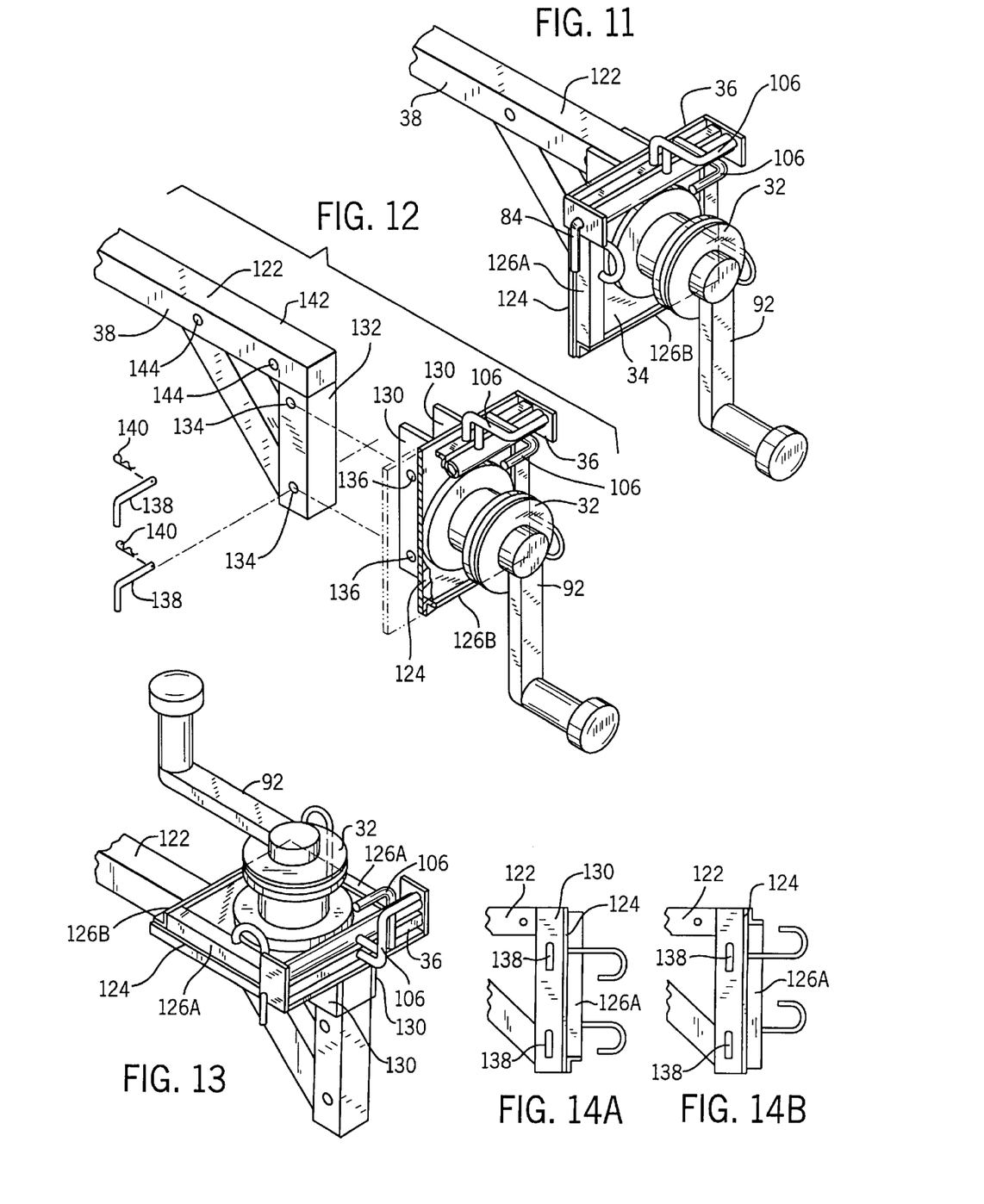
FIG. 11 is a perspective view of the winch mounted to a trailer hitch winch mount.
FIG. 12 is an exploded view of the trailer hitch winch mount illustrated in FIG. 11.
FIG. 13 is a view similar to FIG. 11 in which the winch is mounted on a horizontal platform on the trailer hitch rather than a vertical platform.
FIGS. 14A and 14B illustrate alternative locations for fair leads on the winch mount base plate depending on the orientation of the winch mount base plate on the trailer hitch.

Still referring to FIG. 3, the preferred winch mounting system 100 also includes a trailer hitch winch mount 38. The trailer hitch winch mount 38 includes a trailer hitch fitting 122 that is preferably adapted to fit into a conventional vehicle trailer hitch receiver as is known in the art. The trailer hitch winch mount 38 also includes a winch mounting base plate 124 that is removably or detachably mounted to the fitting 122. A winch mounting plate receiver 126a, 126b is attached to the base plate 124 in a manner similar to which the receiver 52a, 52b is attached to the center backplate 48 of the tree mount 30. Both receiver sidewalls 126a on the winch mount base plate include a pin hole 128. The winch 32 on the aluminum mounting plate 34 is secured in the receiver 126a, 126b using the locking mechanism 36 and locking pin 84 in a manner similar to that previously described in connection with the tree mount 30. FIG. 11 shows the winch 32 mounted on the trailer hitch fitting 122.

Referring to FIG. 12, a pair of mounting struts 130 extend from the back side of the base plate 124. The mounting struts 130 are parallel to each other and are spaced apart a distance corresponding to the width of the trailer hitch fitting 122. The trailer hitch fitting 122 includes a vertical platform 132 for the base plate 124. The struts 130 on the base plate 124 straddle the vertical platform 132 of the trailer hitch fitting 122 when the winch mount is placed in position on the trailer hitch fitting 122. The trailer hitch fitting 122 contains vertical mounting pin holes 134. Struts 130 on the base plate 124 include pin holes 136. Pins 138 pass through pin holes 136 in the struts 130 on the base plate 124 and pin holes 134 on the trailer hitch fitting 122 to secure the winch 32 in a vertical mounting position. Cotter pins 140 can be used to prevent the pins 138 from loosening.

FIG. 14a is a side elevational view of the base plate 124 mounted to the trailer hitch fitting 122 in the vertical position as show in FIGS. 11 and 12. FIG. 14b represents a similar view in which the base plate 124 is turned 180° (i.e. upside down) before mounting. The mounting versatility of the base plate 124 as depicted by FIGS. 14a and 14b allows the user of the winch 32 to select the most appropriate location for the captive fair lead 106.

The trailer hitch fitting 122 also includes a horizontal mounting platform 142, and horizontal mounting pin holes 144. The winch 32 can be mounted in a horizontal position on the trailer hitch fitting 122, see FIG. 13, by passing pins 138 through pin holes 136 in the struts 130 extending from the base plate 124 and the horizontal mounting pin holes 144 in the trailer hitch fitting 122. FIG. 13 shows the captive fair lead 106 facing rearward from the vehicle, however, the mounting base 124 can be rotated 180° if desired in the same manner as previously discussed with respect to FIGS. 14a and 14b.

The invention has been described herein in accordance with the preferred method of implementing the invention. It should be recognized, however, that certain aspects of the invention can be carried out without implementing other aspects of the invention. Furthermore, various alternatives, modifications and improvements may be apparent to those skilled in the art, however, such alternatives, modifications and improvements should be considered to fall within the scope of the following claims.

I claim:

1. A winch mounting system comprising:
    a winch mounted on a winch mounting plate;
    a tree mount that includes a backplate, a winch mounting plate receiver integral with the backplate that is adapted to removably receive the winch mounting plate, and a strap for tightening the mount to a tree; and
    a locking mechanism that secures the winch mounting plate in the receiver, thereby securing the winch in a fixed position relative to the tree when the strap is sufficiently tightened around the tree.

2. A winch mounting system as recited in claim 1 wherein the winch is a self-tailing winch.

3. A winch mounting system as recited in claim 1 wherein the tree mount also includes an outgoing fair lead which is hinge mounted to the tree mount, the hinge-mounted outgoing fair lead having a guide that is repositionable between an in-service position and a non-use position, wherein the guide on the outgoing fair lead is aligned with a return location on a drum of the winch when the winch mounting plate is secured in the receiver and the guide is placed in the in-service position, thereby properly aligning rope on the drum when lowering the rope.

4. A winch mounting system as recited in claim 3 wherein the guide for the outgoing fair lead is a captive, helical guide.

5. A winch mounting system as recited in claim 1 wherein the tree mount also includes an upper incoming fair lead, the upper incoming fair lead having a captive guide which is located above the receiver and aligned with an intake location for the winch when the winch mounting plate is secured in the receiver.

6. A winch mounting system as recited in claim 5 wherein the upper incoming fair lead is mounted on the locking mechanism.

7. A winch mounting system as recited in claim 5 wherein the tree mount also includes:
    a right side incoming fair lead mounted on the right side of the tree mount and aligned with an intake location for the winch when the winch mounting plate is secured in the receiver; and
    a left side incoming fair lead mounted on the left side of the tree mount and aligned with an intake location for the winch when the winch mounting plate is secured in the receiver.

8. A winch mounting system as recited in claim 1 wherein the tree mount also includes:
    a right side wing plate that is pivotally attached to a right side of the backplate;
    a left side wing plate that is pivotally attached to a left side of the backplate; and
    either the right side wing plate or the left side wing plate includes a slot for accepting the hook on the strap.

9. A winch mounting system as recited in claim 1 wherein the winch mounting plate is made from aluminum.

10. A winch mounting system as recited in claim 1 wherein a plurality of elastomeric mounting feet are attached to a back side of the backplate.

11. A winch mounting system as recited in claim 1 further comprising a rope brake mounted on a brake mounting plate which is adapted to be removably received in the receiver on the tree mount backplate and secured therein by the locking mechanism, thereby securing the rope brake in a fixed position relative to the tree when the strap is sufficiently tightened around the tree.

12. A winch mounting system as recited in claim 1 further comprising a pulley mount mounted on a pulley mount mounting plate which is adapted to be removably received in the receiver on the tree mount backplate and secured therein by the locking mechanism, thereby securing the pulley mount in a fixed position relative to the tree when the strap is sufficiently tightened around the tree.

13. A winch mounting system as recited in claim 1 further comprising a trailer hitch winch mount that includes:
    a trailer hitch fitting that is adapted to be secured to a vehicle;
    a winch mount base plate mounted on the trailer hitch fitting; and
    a winch receiver mounted on the winch mount base plate and adapted to removably receive the winch mounting plate;
    wherein the locking mechanism secures the winch mounting plate in the winch receiver on the winch mount base plate.

14. A winch mounting system as recited in claim 13 wherein the winch mount base plate is removably mounted on the trailer hitch fitting.

15. A winch mounting system as recited in claim 14 wherein the trailer hitch fitting includes a horizontal mounting platform for the winch mount base plate and a vertical mounting platform for the winch mount base plate.

16. A winch mounting system as recited in claim 13 wherein the trailer hitch winch mount also includes an incoming fair lead having a captive guide which is aligned with an intake location for the winch when the winch mounting plate is secured within the receiver on the winch mount base plate mounted on the trailer hitch fitting.

17. A winch mounting system as recited in claim 16 wherein the incoming fair lead with the captive guide is mounted on the locking mechanism.

18. A winch mounting system as recited in claim 16 wherein the trailer hitch winch mount also includes two additional incoming fair leads mounted on the winch mount base plate.

19. A tree winch mounting system comprising:
    a tree mount that includes a backplate, and a strap for tightening the tree mount to a tree;

a winch mounted to the backplate;

an outgoing fair lead hinge-mounted to the tree mount, the hinge-mounted outgoing fair lead having a captive guide that is repositionable between an in-service position and a non-use position, wherein the outgoing guide is aligned with a return location on a drum of the winch, thereby properly aligning rope on the drum when lowering the rope.

20. A tree winch mounting system as recited in claim 19 wherein the captive guide on the hinge-mounted outgoing fair lead is a helical guide.

21. A tree winch mounting system as recited in claim 19 wherein the tree mount also includes:

a right side incoming fair lead mounted on the right side of the tree mount and aligned with an intake location for the winch; and a left side incoming fair lead mounted on the left side of the tree mount and aligned with an intake location for the winch.

22. A tree winch mounting system comprising:

a tree mount that includes a backplate and a strap for tightening the tree mount to a tree;

a winch mounted to the backplate;

an upper incoming fair lead mounted to the tree mount, the upper incoming fair lead having a captive guide which is located at a location above the winch and aligned with an intake location for the winch;

a right side incoming fair lead mounted on a right side of the tree mount and aligned with an intake location for the winch; and a left side incoming fair lead mounted on a left side of the tree mount and aligned with an intake location for the winch.

23. A tree mount comprising:

a center backplate;

a first wing plate that is pivotally attached to a first side of the center backplate;

a second wing plate that is pivotally attached to the other side of the center backplate;

a strap winch that is mounted to the first wing plate;

a strap for use in connection with the strap winch for tightening the tree mount to the tree; and a mounting plate receiver integral with the center backplate that is adapted to receive a mounting plate for one or more various tree rigging tools.

24. A tree mount as recited in claim 23 wherein the strap has a hook at its end and the second wing plate includes a slot for accepting the hook on the strap.

* * * * *